(12) United States Patent
Smith

(10) Patent No.: US 11,663,198 B2
(45) Date of Patent: May 30, 2023

(54) METHOD AND SYSTEM FOR MANAGING A NEW RECORD

(71) Applicant: Trident Corporate Services (Singapore) PTE Limited as Trustee for the Oneplace Unit Trust, Singapore (SG)

(72) Inventor: Timothy Julien Smith, Singapore (SG)

(73) Assignee: Trident Corporate Services (Singapore) PTE Limited as Trustee for The Oneplace Unit Trust, Singapore (SG)

( * ) Notice: Subject to any disclaimer, the term of this patent is extended or adjusted under 35 U.S.C. 154(b) by 255 days.

(21) Appl. No.: 17/049,473

(22) PCT Filed: Apr. 15, 2019

(86) PCT No.: PCT/SG2019/050205
§ 371 (c)(1),
(2) Date: Oct. 21, 2020

(87) PCT Pub. No.: WO2019/209170
PCT Pub. Date: Oct. 31, 2019

(65) Prior Publication Data
US 2021/0240699 A1 Aug. 5, 2021

(30) Foreign Application Priority Data
Apr. 23, 2018 (SG) .............................. 10201803391S

(51) Int. Cl.
*G06F 16/23* (2019.01)
*G06F 16/2458* (2019.01)
(Continued)

(52) U.S. Cl.
CPC ............ *G06F 16/2379* (2019.01); *G06F 7/14* (2013.01); *G06F 16/245* (2019.01); *G06F 16/2468* (2019.01); *G06F 3/0482* (2013.01)

(58) Field of Classification Search
CPC ...... G06F 16/2379; G06F 7/14; G06F 16/245; G06F 16/2468; G06F 3/0482; G06F 16/215; G06F 16/2365; G06Q 10/10
(Continued)

(56) References Cited

U.S. PATENT DOCUMENTS

| | | | |
|---|---|---|---|
| 5,628,004 A * | 5/1997 | Gormley | ................ G06Q 30/06 707/999.107 |
| 10,586,611 B2 * | 3/2020 | Tiwari | .................. G06F 16/221 |
| 2009/0271424 A1 | 10/2009 | Bayliss | |
| 2013/0218902 A1 * | 8/2013 | Vendrow | ............. G06F 16/9535 707/E17.014 |

(Continued)

FOREIGN PATENT DOCUMENTS

CN 106294742 1/2017

OTHER PUBLICATIONS

Ahmed K Elmagarmid et al: "Duplicate Record Detection: A Survey", IEEE Transactions on Knowledge and Data Engineering, IEEE Service Centre, Los Alamitos, CA, US, vol. 19, No. 1, Jan. 1, 2007 (Jan. 1, 2007), pp. 1-16, XP011144331, ISSN: 1041-4347, DOI: 10.1109/TKDE.2007.250581.

(Continued)

*Primary Examiner* — Phong H Nguyen
(74) *Attorney, Agent, or Firm* — Sterne, Kessler, Goldstein & Fox P.L.L.C.

(57) ABSTRACT

A method and system of managing a new client record for a client record management system, including creating a new client record, comparing the new client record against at least an existing client record in a database, generating a table with a picklist, with the picklist presenting a suggested (Continued)

record, which is selected from an existing client record in the database, displaying the table and presenting the picklist for a confirmation by a user, and merging the new client record with the existing client record based on the confirmation by the user, where the picklist presents the suggested record based on a criterion, the criterion being a match in a field between the new client record and the suggested record.

18 Claims, 7 Drawing Sheets

(51) Int. Cl.
  *G06F 16/245* (2019.01)
  *G06F 7/14* (2006.01)
  *G06F 3/0482* (2013.01)

(58) Field of Classification Search
  USPC .................. 707/732, 736, 756, 758, 802
  See application file for complete search history.

(56) References Cited

U.S. PATENT DOCUMENTS

2014/0101004 A1* 4/2014 Marseille .............. G06Q 10/10
  705/30
2018/0060537 A1* 3/2018 Tiwari ................ G06F 16/2282

OTHER PUBLICATIONS

Extended Search Report directed to related European Patent Application No. 19732326.1, dated Jun. 16, 2021; 9 pages.
International Search Report and Written Opinion of the International Searching Authority directed to related International Patent Application No. PCT/SG2019/050205, dated Jul. 18, 2019; 9 pages.
QuickStart Guide 3—Matching. Oct. 8, 2017. [Retrieved on Jun. 26, 2019 from https://www.clearmdm.com/wp-content/uploads/2017/05/clearMDM-QuickStart-Guide-3-Matching-v1.3.pdf].
Cleaning Messy Data in SQL, Part 1: Fuzzy Matching Names. Apr. 15, 2018. [Retrieved on Jun. 26, 2019 from https://web.archive.org/web/20180415050835/https://www.decisivedata.net/blog/cleaning-messy-data-sql-part-1-fuzzy-matching-names].

* cited by examiner

| Client name | Client code | Open date | Billing Address | Matching Company name | Date last edited | Number of contacts | Main address |
|---|---|---|---|---|---|---|---|
| | | | | Company 1 [MATCH] | | | |
| | | | | Company 2 [MATCH] | | | |
| | | | | Company 3 [MATCH] | | | |
| | | | | Company 4 [MATCH] | | | |
| | | | | Company 5 | | | |
| | | | | . . . | | | |

METHOD AND SYSTEM FOR MANAGING A NEW RECORD

TECHNICAL FIELD

The present invention relates to a method and system for managing a new record in a database. More specifically, the present invention relates to matching a new record with an existing client efficiently and accurately.

BACKGROUND

Within a record management system for understanding and communicating with clients, both prospective and past, contacts and the like, client records are populated with information that can be used by the users for various purposes. There are various types of records with various fields and information relevant to the user, that are created in a client management database, where new company entries are fed into a system of client records and that can be linked with a billing system to enable ease of client records management. The process of matching a new company with an existing client record can be laborious as the most accurate way of matching client is for a user known as a data steward to manually screen, search and/or match an existing company record with the new company entry.

Another example of a record is a pipeline opportunity record, which are entered or created by users of the system to record the details of a potential client after meeting the client or after being referred the work from another company. These are linked to matter records once the potential client becomes a client, and since matter records can be created separately or by a billing system, this can result in a large number of duplicate records.

Furthermore, this matching of an existing company record with the pipeline opportunity record is based on a one-to-one relationship, which means that the conversion of a potential company or opportunity to a client or current matter is done singularly, which results in duplicate records being created in order to keep track of the various matters and relationships created by the user.

Hence, there is a need for a client and matter data processing management system and method that is able to match the relevant records quickly and efficiently, but accurately and have this information presented in a meaningful way.

SUMMARY

The above and other problems are solved and an improvement in the art is made by a method and system in accordance with this invention. A first advantage of the method and system in accordance with this invention is that duplicate company records and pipeline opportunities are reduced. This ensures greater efficiency in managing client records in requiring less time to access. A second advantage of the method and system in accordance with this invention is that the integrity of the records and the data contained within is preserved. Any doubt on the data when merging or combining or linking the records can be catastrophic for a user and the system prevents mistakes by automating the process. A third advantage of the method and system in accordance with this invention is that it allows a data steward to easily manage the company and client records with each other, as well as with the pipeline opportunities. This provides users with insights into the various relationships between companies and clients, as well as their origin pipeline opportunities quickly and efficiently.

The present invention provides a system and method for managing a new client record for a client record management system. In one embodiment in accordance with the invention, there is a method for managing a new client record for a client record management system comprising creating a new client record; comparing the new client record against at least an existing client record in a database; generating a table with a picklist, the picklist presenting at least a suggested record, the suggested record being selected from an existing client record in the database; displaying the table and presenting the picklist for a confirmation by a user; and merging the new client record with the existing client record based on the confirmation by the user; where the picklist presents the suggested record based on a criterion, the criterion being a match in a field between the new client record and the suggested record. In some embodiments, the criterion is a direct match in a field between the new client record and the suggested record. In alternative embodiments, the criterion is a partial match in a field between the new client record and the suggested record. In yet alternative embodiments, the criterion is a match based on fuzzy comparison technique. In accordance with further embodiments of the invention, the picklist includes an option for each of the suggested record, where the option causes the system to merge the suggested record with the new client record. In further embodiments, a secondary picklist presenting at least a suggested pipeline opportunity related to the suggested record. Other embodiments according to the invention have the suggested pipeline opportunity presented based on a secondary criterion. Alternative embodiments have the secondary picklist includes a secondary option beside the suggested pipeline opportunity, where the secondary option causes the system to link the suggested pipeline opportunity with the new client record.

In accordance with an embodiment, there is a system for managing a new client record for a client record management system, the system comprising a client record management system including a processor and memory; a database module including a processor and memory configured to process and store a plurality of client records; an accounting module including a processor and memory configured to managing a billing system; a data processing system including a processor and memory, the data processing system configured to: create a new client record; compare the new client record against at least an existing client record in the database module; generate a table with a picklist, the picklist presenting at least a suggested record, the suggested record being selected from an existing client record in the database module; display the table and present the picklist for a confirmation by a user; and merge the new client record with the existing client record based on the confirmation by the user; where the picklist presents the suggested record based on a criterion, the criterion being a match in a field between the new client record and the suggested record.

In further embodiments, the picklist includes an option for each of the suggested record, where the option causes the system to merge the suggested record with the new client record. In yet further embodiments in accordance with the invention, there is a secondary picklist, the secondary picklist presenting at least a suggested pipeline opportunity related to the suggested record. In some embodiments of the invention, the secondary picklist presents the suggested pipeline opportunity based on a secondary criterion. Some alternative embodiments have the secondary picklist includes a secondary option beside the suggested pipeline opportunity, where the secondary option causes the system to link the suggested pipeline opportunity with the new client record.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 6 illustrates a table generated by the system when creating a client record in accordance with an embodiment of the invention.

DETAILED DESCRIPTION

The various configurations discussed in these non-limiting examples can be varied and are used to illustrate at least one embodiment and are not intended to limit the scope thereof.

Figure 1:
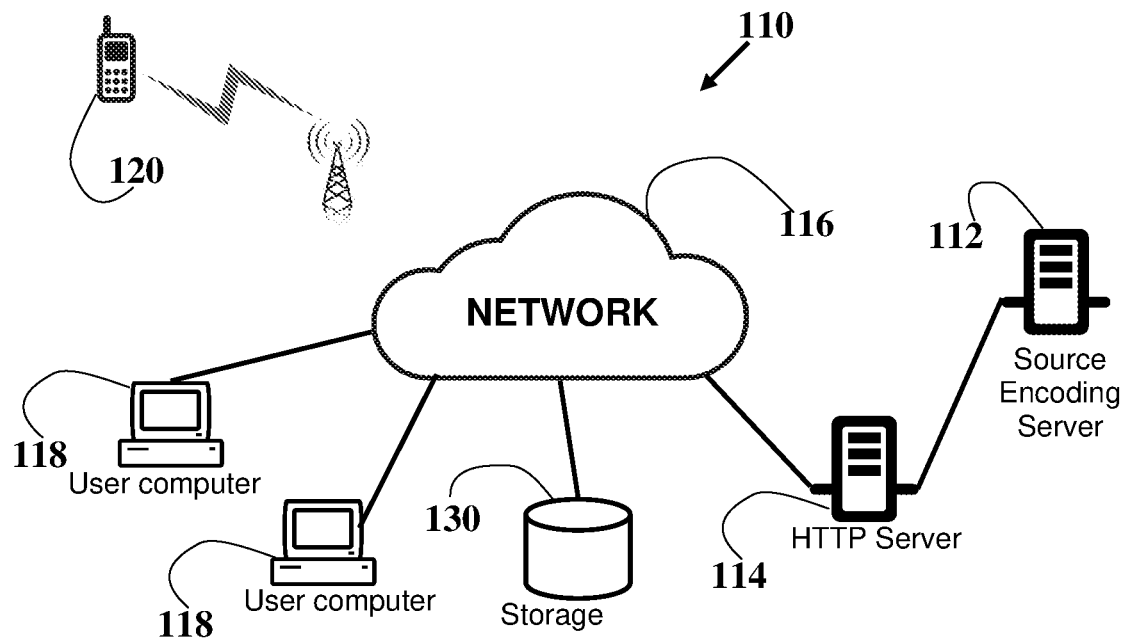
FIG. 1 illustrates a representation of a network of data processing systems in which aspects of the disclosed embodiments may be implemented.

FIG. 1 shows a record system in accordance with an embodiment of the invention is illustrated. The system 110 includes a server 112. In other embodiments, the server 112 can be any processing device including a processor and sufficient resources to perform the process of providing a rebate to a customer. The server 112 can be any processing device including a processor and sufficient resources to perform the process of providing a rebate to a customer. The server 112 is connected to an HTTP server 114. HTTP server 114 uses HTTP or any other appropriate stateless protocols to communicate via a network 116 such as the Internet, with any other device connected to the network 116.

In the illustrated embodiment, user devices include personal computers 118, CE players, and mobile phones 120. In other embodiments, user devices can include consumer electronic devices such as televisions, set top boxes, video game consoles, tablets, and other devices that are capable of connecting to a server via HTTP and playing back encoded media. A storage unit 130, which can be in the form of memory, databases etc., is in communication with the network 116. Although a specific architecture is shown in FIG. 1, any of a variety of architectures including system that perform conventional processes can be utilized that enable playback devices to request portions of the top level index file and the container files in accordance with embodiments of the invention.

Figure 2:
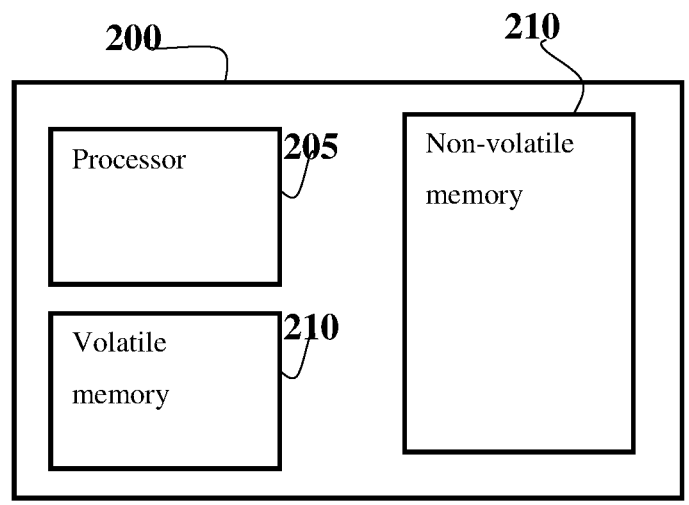
FIG. 2 illustrates a schematic view of a software system for carrying out an embodiment.
Figure 3:
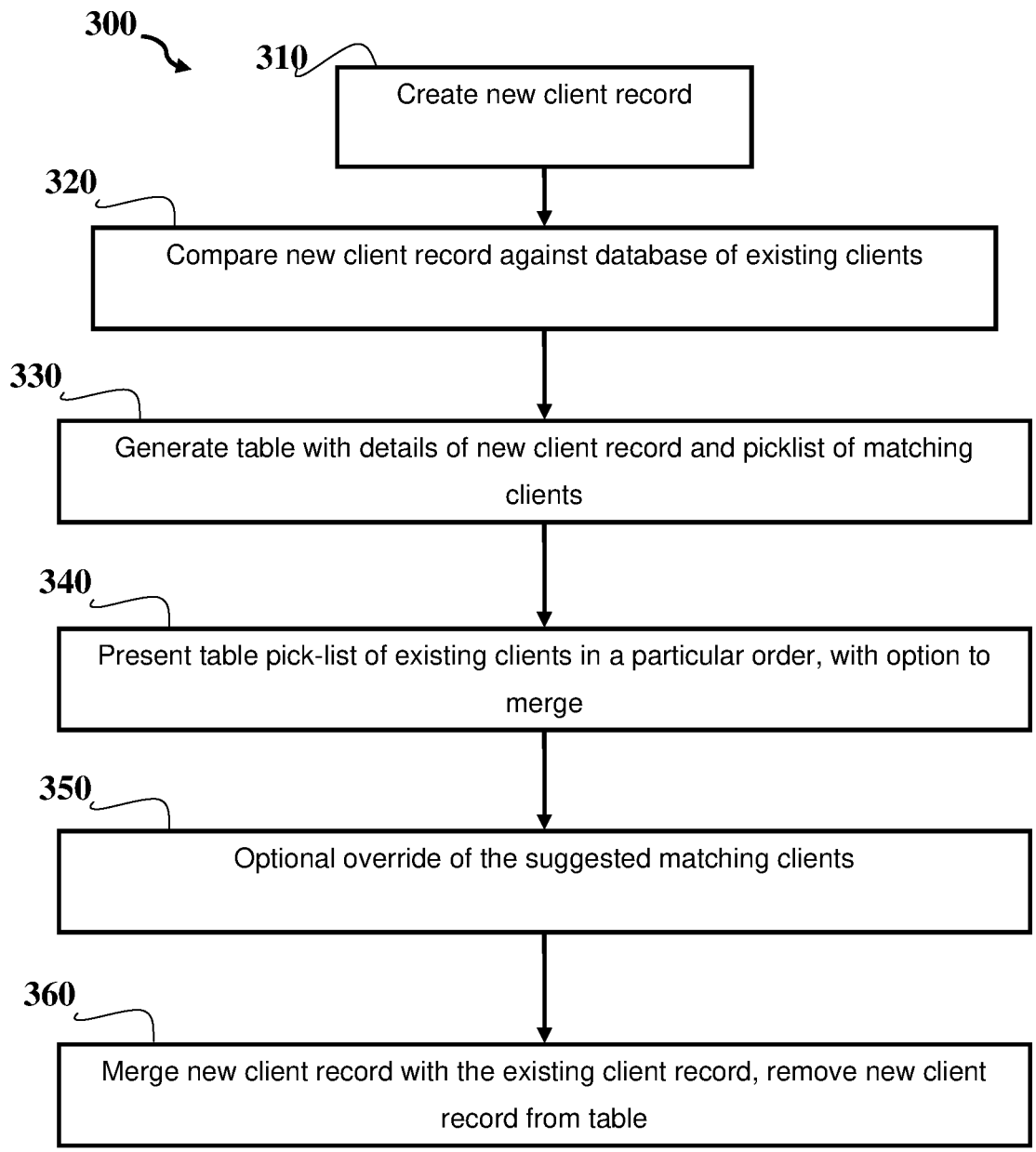
FIG. 3 illustrates a method of creating a client record in accordance with an embodiment of the invention.

Some process for providing methods and systems in accordance with embodiments of this invention are executed by a user device or user mobile device. The relevant components in a playback device that can perform processes including adaptive streaming processes in accordance with embodiments of the invention are shown in FIG. 2. One skilled in the art will recognize that user device 200 may include other components that are omitted for brevity without departing from the embodiments of the invention as described. The user device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store processor instructions utilized to configure the user device 200 to perform processes including processes in accordance with embodiments of the invention and/or data for the processes being utilized. In other embodiments, the user device software and/or firmware can be stored in any of a variety of non-transitory computer readable media appropriate to a specific application.

The communications network refers to any contact between the parties described and is accomplished through any suitable communication means, including, but not limited to, a telephone network, public switch telephone network, intranet, Internet, extranet, WAN, LAN, point of interaction device, point of sale device, personal digital assistant, cellular phone, kiosk terminal, automated teller machine (ATM), etc.), online communications, off-line communications, wireless communications, satellite communications, and/or the like. One skilled in the art will also appreciate that, for security reasons, any databases, systems, or components of the present invention may consist of any combination of databases or components at a single location or at multiple locations, where each database or system includes any of various suitable security features, such as firewalls, access codes, encryption, de-encryption, compression, decompression, and/or the like.

The relevant figures illustrate a high-level flow chart of operations illustrating logical operational steps of a method 300 for managing a new client record for a client record management system, in accordance with the disclosed embodiments. It can be appreciated that each of the steps or logical operations of the method 300 depicted can be implemented by executing a program instruction or a group of instructions in the record management system.

The method 300 starts when the detail of a new company is fed into the system and the record management system creates a new client record 310. The record management system processes the new client record and compares it against a database of existing clients 320. The result of this comparison is the record management system generates a table with details of the new client record with a picklist of matching companies 330 and presents it to the user 340. The user is also able to override the system, and change the selection criterion or order of the picklist if required 350.

The new client records can be listed as rows with details from the billing system, with field such as client code, open date, billing address, etc. Alongside a field "matching company name", where the system provides the user a pick-list or picklist of client records to choose from, while displaying helpful fields such as date last edited, number of contacts, main address city, etc. An option to merge the record can be presented to the user based on a successful match of an existing client record; this would trigger the system to combine the new client record with the existing record. In some embodiments, the combining of the new client record with the existing record deals with any conflicting fields (where the fields do not match) by using the most recent, or displaying both with the most recent on top. In an embodiment, the option to merge is presented next to each individual existing client record to ensure the correct records are merged. The number of existing client records displayed in the picklist can be pre-determined by the user or the administrator to avoid information overload.

In one embodiment, the system provides the client records in the pick-list based on an algorithm that locates an exact name match with an existing client record, while filtering out extra characters and words such as private limited, pvt ltd, limited, inc, etc. Alternatively, fuzzy logic or any other form of machine learning can be used to match the new client with an existing client record, for example where there is a matching pre-determined number of consecutive characters in the company name, after filtering out extra characters and words such as private limited, pvt ltd, limited, inc, etc. In some embodiments, the system selects the companies that appear in the pick-list based on the date the client or company record was last edited, or created. Other criterion that the companies displayed in the pick-list include the number and most recent records of contacts, activities, pipeline opportunities, and matters created against it. This criterion can also be used in combination to generate a score such that records with the highest score are listed first in the pick-list. This is useful when requiring that the displayed pick-list show existing client records by their level of activity. In other embodiments, the companies are listed in the pick-list alphabetically, and this can be useful if the system is at its initial stages, and this can be an option presented to the user to override any pick-list 350 and to display the companies alphabetically or any other desired sequence.

In some embodiments, the system removes the new client record from the table 360 after merging the new client record with the existing client record.

In another embodiment, the conversion of pipeline opportunity records into matter records can also be managed by the system. The system would allow for many-to-one relationships, where pipeline opportunities are converted into multiple matter records. The system can present this in a separate picklist that may exist on its own or in tandem with the company picklist above.

Figure 4:
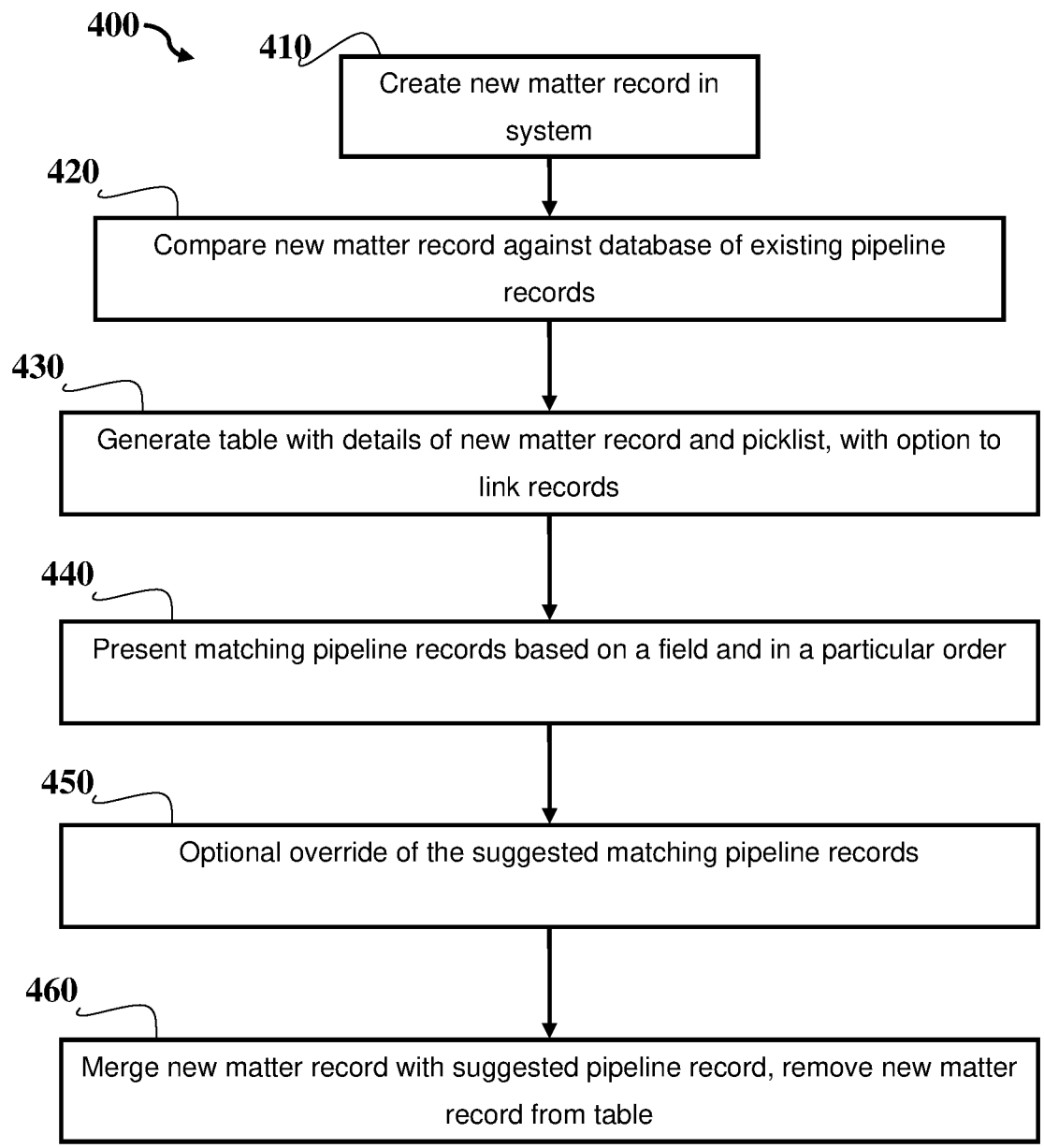
FIG. 4 illustrates a method of creating a matter record in accordance with an embodiment of the invention.

FIG. 4 illustrates a high-level flow chart of operations illustrating logical operational steps of a method 400 for managing a new client record for a client record management system, in accordance with the disclosed embodiments. It can be appreciated that each of the steps or logical operations of the method 400 depicted in FIG. 4 can be implemented by executing a program instruction or a group of instructions in the record management system.

At times, an opportunity or prospective client record is first created if an initial favourable meeting is made without a formal relationship being formed. These new company entries can be linked with an initial file also known as opportunity or prospective client's records.

The method 400 starts when the detail of a new matter is fed into the system and the record management system creates a new matter record 410. The record management system processes the new matter record and compares it against a database of existing pipeline records 420. The result of this comparison is the record management system generates a table with details of the new matter record with a picklist of matching pipeline records 430 and presents it to the user 440, with an optional override of the suggested picklist of matching pipeline records 450. In some embodiments, the system removes the new matter record from the table after linking the new client record with the pipeline record 460. Scoring can be used to rate the pipeline opportunities, such that pipeline opportunities that have the highest score can be listed first in the picklist. The optional override 450 can be used to change the order of the pick list, for example into alphabetical order, or more recently accessed, or by file opening date, etc.

The algorithm that matches the company name and pipeline opportunity can look for similar words in a particular field, for example in the name or contact field, and this enables the system to note that "big black bear" is similar to "bear big and black".

Figure 5:
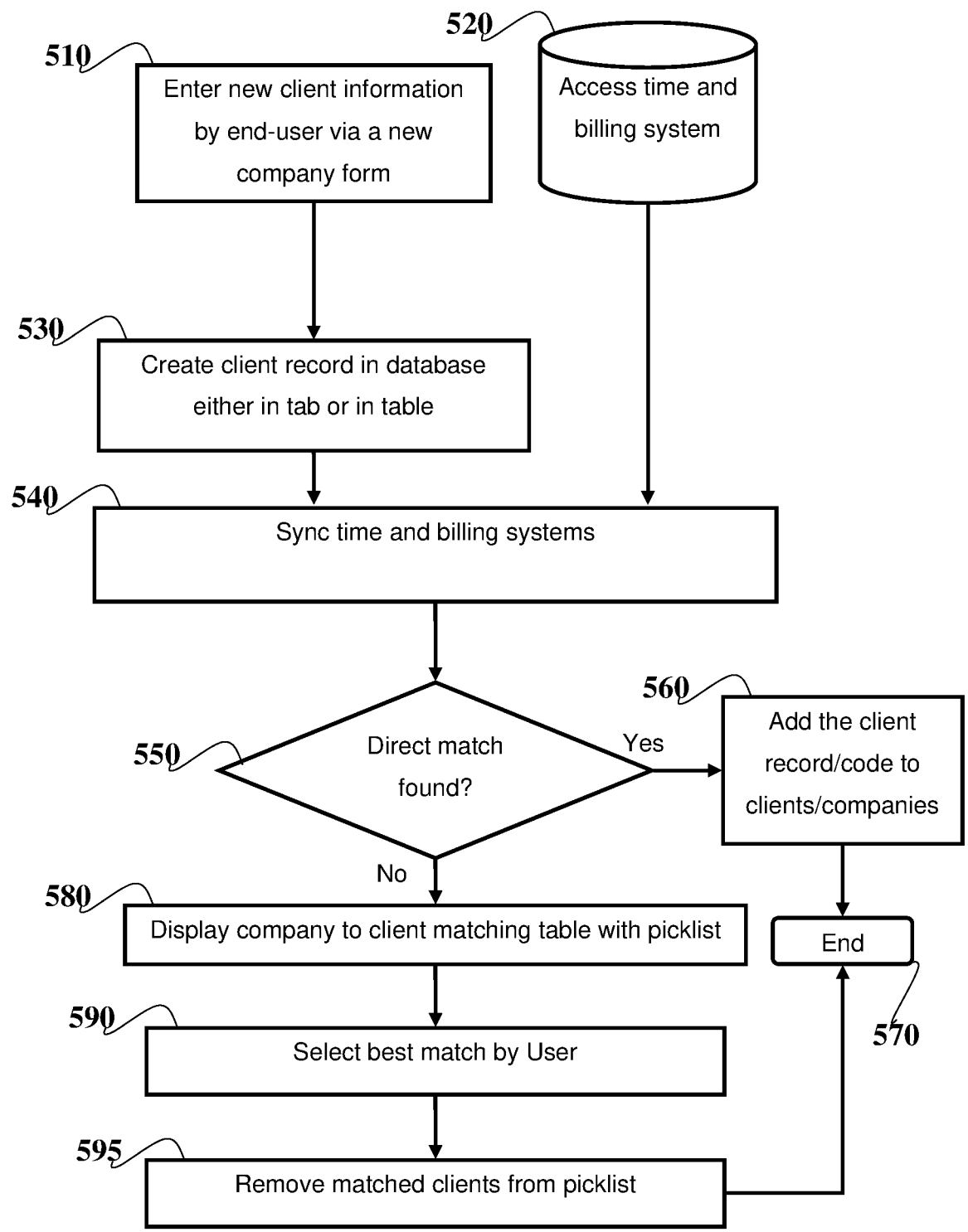
FIG. 5 illustrates the flow of the overall system in creating a client record in accordance with an embodiment of the invention.

Another view of the system can be seen in FIG. 5, which is triggered when new client information is entered by a user or end-user into the system, which can be via an electronic form. In some systems, the form can be hosted online where it can be easily accessed and submitted if required. The client record is created in the company tab or table within the system 530. At the same time, the time and billing system or an accounting module is accessed 520, and synced with the new client record 540. The system determines if a direct match is found 550, if so to add the client record to the database 560 and the process ends 570. To make the system more accurate and efficient, extra common words and acronyms like "the", "pte" "ltd" can be ignored when making the determination. If no direct match is found, the system can provide suggested records via a picklist within a table 580. An example of the table 600 and picklist 610 can be seen in FIG. 6. The user can select a best match 590 and the matched clients fall off or are removed from the picklist and do not get displayed in the table again 595, and the process ends 570. In some embodiments, the suggested records in the picklist can be chosen based on any one of the date the client or company record was last edited, or created, the number and most recent records of contacts, activities, pipeline opportunities, and matters created against it, with a score generated such that records with the highest score are listed first in the picklist 610. A button beside each suggested record is shown 620, although one skilled in the art would appreciate this is merely exemplary in terms of how the user inputs, indicates, selects or confirms a suggested record. Based on the input of the user, the system would then merge the new client record with the suggested existing record.

Figure 7:
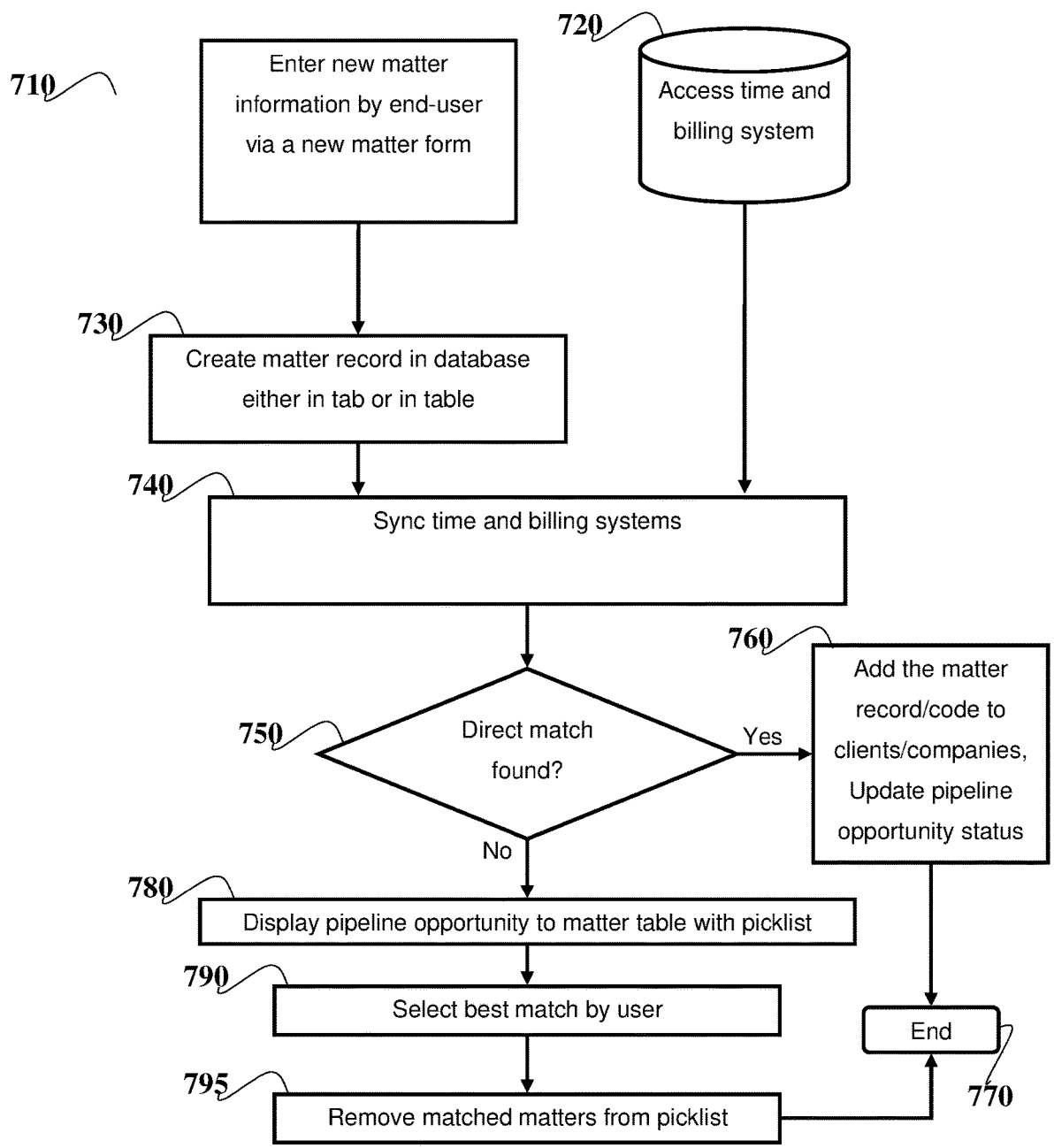
FIG. 7 illustrates the flow of the overall system in creating a matter record in accordance with an embodiment of the invention.
Figure 8:
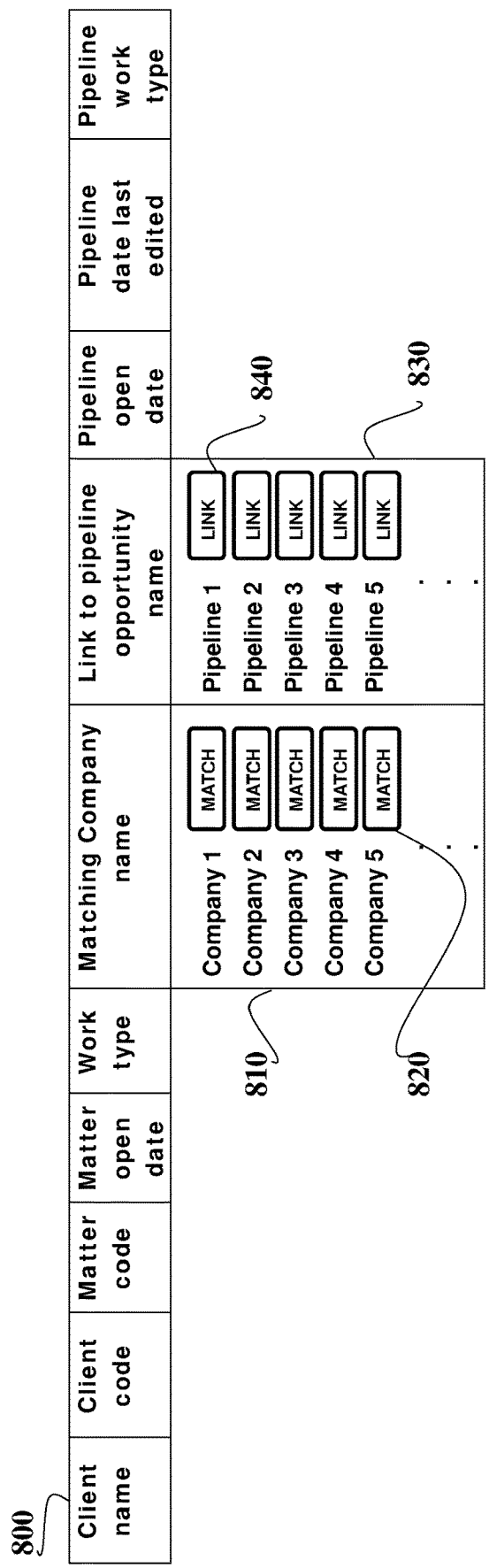
FIG. 8 illustrates a table generated by the system when creating a matter record in accordance with an embodiment of the invention.

In another embodiment shown in FIG. 7, a new matter can be created via a new matter form 710 and the matter record is created in the database in the matter tab or table. The system accesses a time and billing system or an accounting module 720, and syncs the time and billing with the new matter record 740. If a direct match is found 750, the system would add or link the matter record to the client and/or company and update the pipeline opportunity status accordingly 760 and the process ends 770. When no direct match is found, the system can display 780 a picklist within a table that can allow the user to link a pipeline opportunity to a matter, and the user selects the best match 790, after which the matched matters are removed from the picklist or fall off, and do not get displayed again 795 and the process ends 770. An example of the table 800 can be seen in FIG. 8, which shows an embodiment where two picklists 810, 830 are shown with their corresponding buttons 820, 840.

As understood by one of ordinary skill in the art, the present invention can be implemented with special purpose computers, devices, and servers that are programmed to implement the embodiments described herein. Further, the system according to the embodiments disclosed herein is able accommodate many more combinations and permutations, or any other future electronic payment methods. For example, the system according to the embodiments disclosed herein can accommodate cloud based or app based record management system as well.

Thus, the present invention has been fully described with reference to the drawing and figures. Although the invention has been described based upon these preferred embodiments, to those of skill in the art, certain modifications, variations, and alternative constructions would be apparent, while remaining within the spirit and scope of the invention. In order to determine the metes and bounds of the invention, therefore, reference should be made to the appended claims.

The invention claimed is:

1. A method for decreasing access time of client records, the method comprising:
creating, by at least one processor, a new client record;
comparing, by the at least one processor, the new client record against the existing client records in a database;
generating, by the at least one processor, a table based on the comparing the new client record against the existing client records, wherein the table comprises a picklist configured to present an existing client record as a suggested record along with a corresponding user interface element configured to merge the suggested record with the new client record;
displaying, by the at least one processor, the picklist;
receiving, by the at least one processor, a confirmation for the suggested record in the picklist;
merging, by the at least one processor, the new client record with the suggested record in response to the receiving the confirmation; and
removing, by the at least one processor, the new client record from the table after the merging.

2. The method of claim 1, wherein the picklist is further configured to present the suggested record based on a direct match in a field between the new client record and the suggested record.

3. The method of claim 1, wherein the picklist is further configured to present the suggested record based on a partial match in a field between the new client record and the suggested record.

4. The method of claim 1, wherein the picklist is further configured to present the suggested record based on a fuzzy comparison technique.

5. The method of claim 1, wherein the table comprises a secondary picklist, wherein the secondary picklist is configured to present a suggested pipeline opportunity related to the suggested record.

6. The method of claim 5, wherein the suggested pipeline opportunity is presented based on a criterion.

7. The method of claim 5, wherein a secondary picklist is configured to present a suggested pipeline opportunity related to the suggested record along with the corresponding second user interface element configured to link the suggested pipeline opportunity with the new client record.

8. A system for decreasing access time of client records, the system comprising:
a memory, and
at least one processor coupled to the memory and configured to:
create a new client record;
compare the new client record against the existing client records in a database;
generate a table based on the comparison, wherein the table comprises a picklist configured to present an existing client record as a suggested record alone with a corresponding user interface element configured to merge the suggested record with the new client record;
display the picklist;
receive a confirmation for the suggested record in the picklist;
merge the new client record with the suggested record in response to the receiving the confirmation; and
remove the new client record from the table after the merging.

9. The system of claim 8, wherein the table comprises a secondary picklist, wherein the secondary picklist is configured to present the suggested pipeline opportunity related to the suggested record.

10. The system of claim 9, wherein the suggested pipeline opportunity is presented based on a criterion.

11. The system of claim 9, wherein the secondary picklist is configured to present the suggested pipeline opportunity related to the suggested record along with the corresponding second user interface element configured to link the suggested pipeline opportunity with the new client record.

12. The system of claim 8, wherein the picklist is further configured to present the suggested record based on a direct match in a field between the new client record and the suggested record.

13. The system of claim 8, wherein the picklist is further configured to present the suggested record based on a partial match in a field between the new client record and the suggested record.

14. The system of claim 8, wherein the picklist is further configured to present the suggested record based on a fuzzy comparison technique.

15. A non-transitory computer-readable medium having instructions stored thereon that, when executed by at least one computing device, causes the at least one computing device to perform operations comprising:
creating a new client record;
comparing the new client record against existing client records in a database;
generating a table based on the comparing the new client record against the existing client records, wherein the table comprises a picklist configured to present an existing client record as a suggested record along with a corresponding user interface element configured to merge the suggested record with the new client record;
displaying the picklist;
receiving a confirmation for the suggested record in the picklist;
merging the new client record with the suggested record in response to the receiving the confirmation; and
removing the new client record from the table after the merging.

16. The non-transitory computer-readable medium of claim 15, wherein the picklist is further configured to present the suggested record based on a direct match in a field between the new client record and the suggested record.

17. The non-transitory computer-readable medium of claim 15, wherein the picklist is further configured to present the suggested record based on a partial match in a field between the new client record and the suggested record.

18. The non-transitory computer-readable medium of claim 15, wherein the picklist is further configured to present the suggested record based on a fuzzy comparison technique.

* * * * *

UNITED STATES PATENT AND TRADEMARK OFFICE
CERTIFICATE OF CORRECTION

| | |
|---|---|
| PATENT NO. | : 11,663,198 B2 |
| APPLICATION NO. | : 17/049473 |
| DATED | : May 30, 2023 |
| INVENTOR(S) | : Smith |

It is certified that error appears in the above-identified patent and that said Letters Patent is hereby corrected as shown below:

In the Claims

In Column 7, Claim 8, Line 64, delete "memory," and insert -- memory; --, therefor.

In Column 8, Claim 8, Line 5, delete "alone" and insert -- along --, therefor.

Signed and Sealed this
Twenty-fifth Day of July, 2023

*Katherine Kelly Vidal*

Katherine Kelly Vidal
*Director of the United States Patent and Trademark Office*